A. J. MICHELIN.
WHEEL TIRE.
APPLICATION FILED JULY 31, 1907.

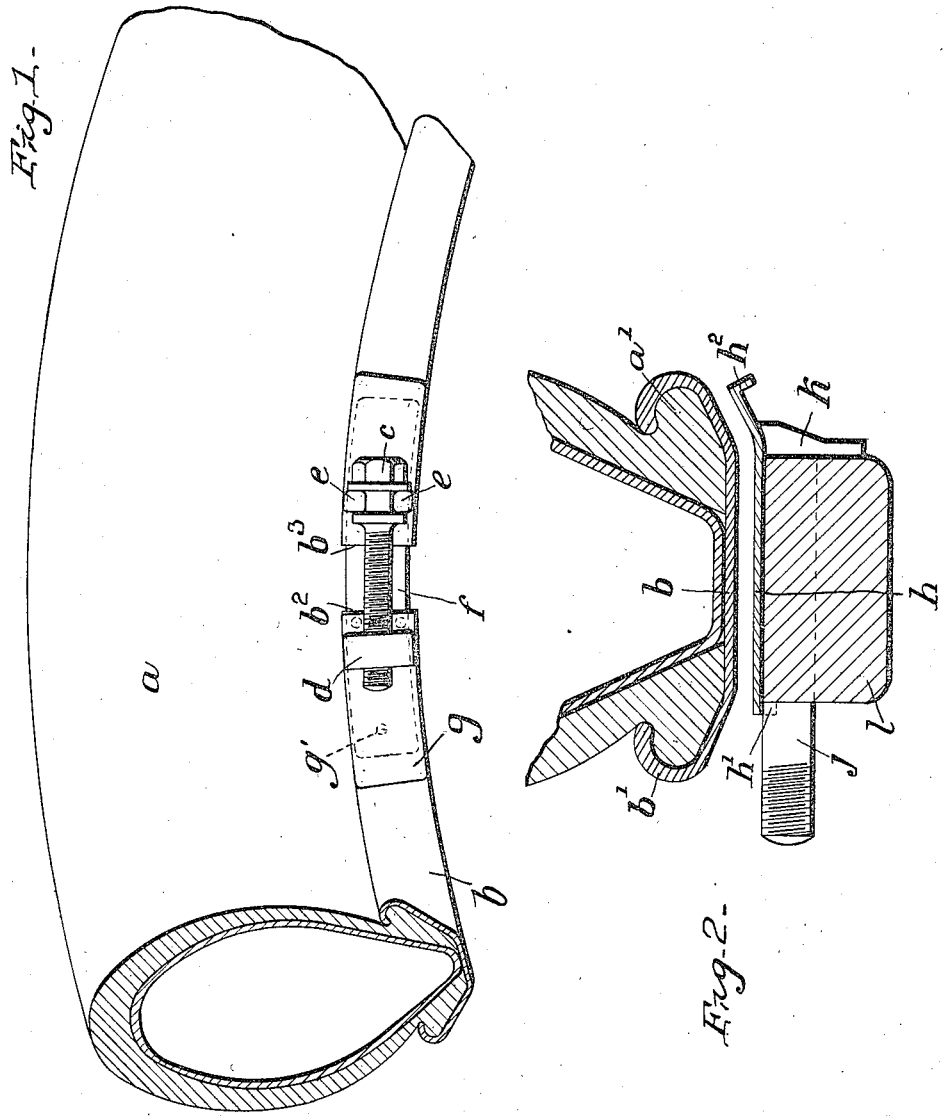

1,129,706.

Patented Feb. 23, 1915.
3 SHEETS—SHEET 2.

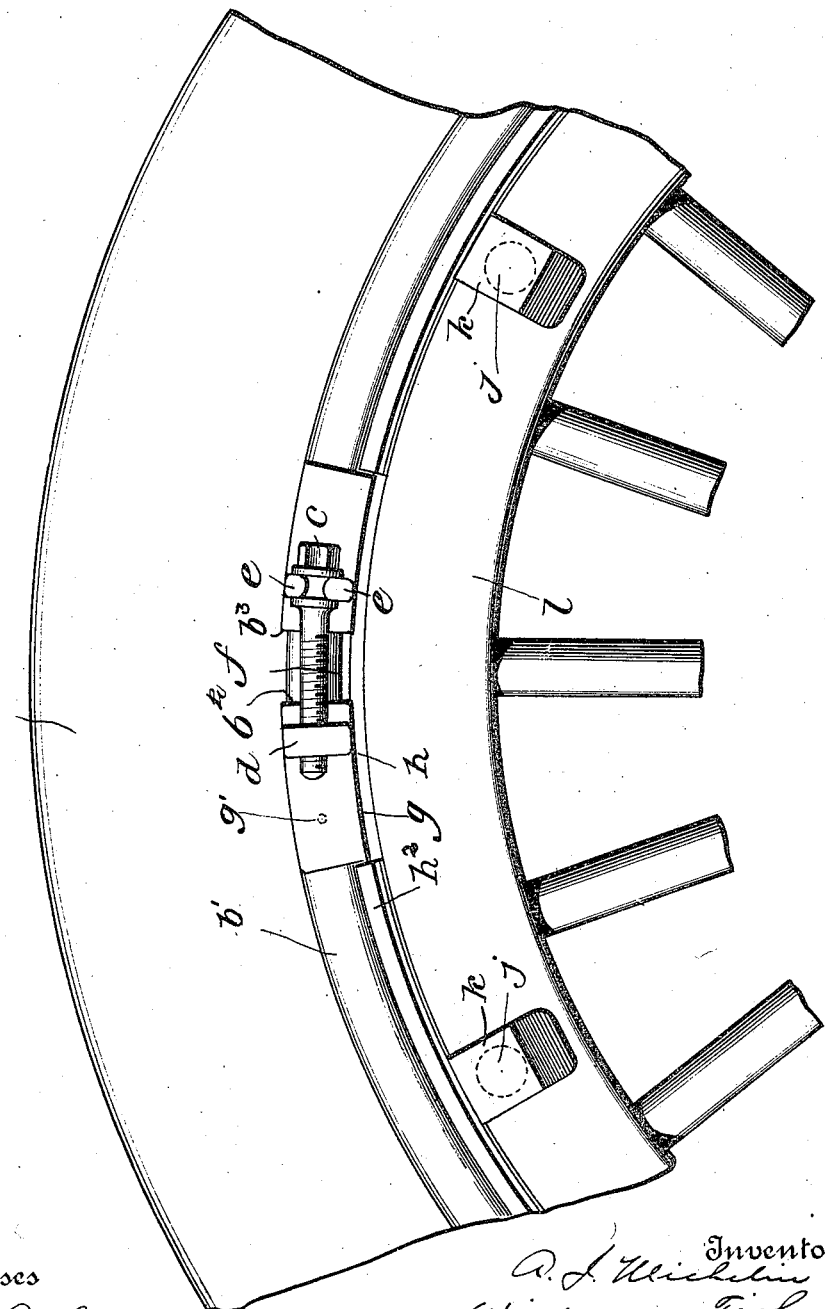

UNITED STATES PATENT OFFICE.

ANDRÉ JULES MICHELIN, OF CLERMONT-FERRAND, FRANCE.

WHEEL-TIRE.

1,129,706. Specification of Letters Patent. Patented Feb. 23, 1915.

Application filed July 31, 1907. Serial No. 386,470.

*To all whom it may concern:*

Be it known that I, ANDRÉ JULES MICHELIN, manufacturer, a citizen of the Republic of France, residing at Clermont-Ferrand, France, have invented certain new and useful Improvements in Wheel-Tires; and I do hereby declare the following to be a full, clear, and exact description of the invention, such as will enable others skilled in the art to which it appertains to make and use the same.

This invention relates to improvements in wheel tires, and is particularly designed to provide means whereby a removable rim, carrying a fully inflated pneumatic tire, may be readily attached to, and disengaged from, the fixed rim of a vehicle wheel.

Broadly, the present invention consists in a removable rim split or cut transversely and carrying a fully inflated tire, said rim being of a diameter to closely fit the fixed rim of a vehicle wheel, which removable rim may be expanded against the pressure of the inflated tire, so that the removable rim may be slipped over the fixed rim. The tools for expanding the rim being then removed, the pressure of the inflated tire, exerting on the removable rim, a pressure as much as 3,000 pounds, contracts the said rim, binding it firmly upon the fixed rim. In addition, means for positively drawing the ends of the removable rim together may be used, if desired.

Figure 3:
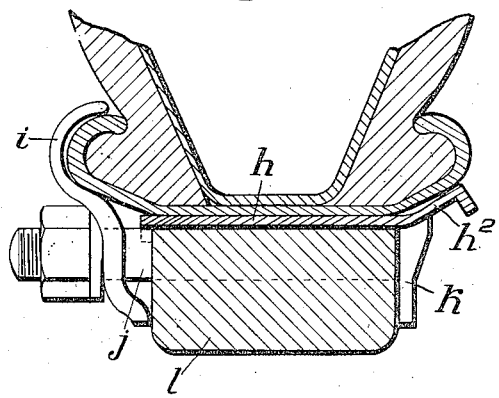
Figure 4:
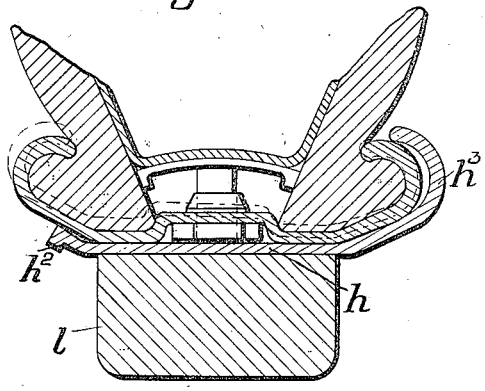

In the accompanying drawings Figure 1 is a side elevation of a part of a removable rim, carrying an inflated tire. Fig. 2 is a cross-section, showing the felly, the fixed rim carried thereby, and the removable rim carrying the inflated tire, a portion only of the latter being shown, and the removable rim being expanded. Fig. 3 is a view similar to Fig. 2, but showing the removable rim tightly fitting upon the fixed rim and also showing clamping means for holding the rims together. Fig. 4 is a view similar to Fig. 3, with the clamping means omitted and the removable rim indented to retain the nut of the inflation valve stem and showing in dotted lines the removable rim in its expanded position, and also showing the fixed rim provided with a clamping hook. Fig. 5 is a side view of the outer part of a portion of a vehicle wheel, showing means for expanding the removable rim and for drawing the ends of the removable rim together.

$l$ represents the felly, preferably made of wood, and $h$ the fixed rim mounted thereon. The fixed rim is provided with means furnishing an abutment against which the removable rim may be forced, such as the projection $h^2$, Fig. 2, or the inwardly curved supporting parts $h^3$, Fig. 4. Any suitable means may be employed for holding the removable rim upon the fixed rim, such as the strong spring clamps $i$, Fig. 3, secured on bolts $j$, passing through the felly and provided with nuts and heads $k$.

$b$ designates the removable rim, preferably made of steel, and having inwardly curved flanges $b'$, between which is carried the fully inflated tire $a$, having tongue portions $a'$. This removable rim is cut transversely as shown in Figs. 1 and 5, $b^2$ and $b^3$ designating the ends of the removable rim.

To close the gap between the ends $b^2$ and $b^3$, I provide a metal plate $f$, curved conformably to the curve of the removable rim and attached by rivets $g'$ to the end $b^2$. It should be noted that the contraction produced by the inflated tire can compress the removable rim $b$ until the ends $b^2$ and $b^3$ strike each other, when any further compression is stopped by the striking of said ends against each other.

Any suitable means may be employed for expanding the removable rim $b$, so that it may readily be slipped upon the fixed rim, as shown in Fig. 2. In Figs. 1 and 5 such means are shown, including members $g$, secured to the ends $b^2$ and $b^3$, respectively, of the removable rim. One of these members $g$ is provided with screw-threaded nuts $d$ and the other is provided with slotted lugs $e$. Bolts $c$, each having a rounded recess in its head, adapted to fit into the corresponding slotted lug $e$, but to revolve freely therein, are provided, and engage the nuts $d$, the construction on each side of the removable rim $b$ being the same. The expanding device may be made independent of the removable rim and put on this removable rim when it is desired to open it. The members $g$ are of the same shape in cross section as the removable rim.

By turning the bolts $c$ the ends $b^2$ and $b^3$ of the removable rim may be forced away from each other, against the pressure of the fully inflated tire, so that the removable rim may be easily slipped over the fixed rim, as shown in Fig. 2. On turning the bolts c in the reverse direction the pressure of the inflated tire will immediately contract the removable rim, binding it firmly to the fixed rim. In addition to the holding force of the inflated tire, the bolts c also serve to hold the removable rim upon the fixed rim, but under ordinary conditions, the pressure of the inflated tire is fully sufficient to accomplish this result.

I do not limit myself to the particular means shown for expanding the removable rim against the pressure of the inflated tire, for other means will readily suggest themselves to those skilled in the art. Any suitable means may be employed for expanding the removable rim before it is placed upon the fixed rim, and for locking the removable rim upon the fixed rim after the removable rim has been allowed to contract, under the pressure of the inflated tire, and to firmly grip the fixed rim.

After the removable rim has been placed over the fixed rim, as shown in Fig. 2, the expanding means are manipulated so that the pressure of the inflated tire will contract the removable rim until it engages the fixed rim, as shown in Fig. 3. The clamps i are then slipped over the bolts k and the nuts screwed home on said bolts, making a compact and firm wheel structure. To remove the rim b, with the tire thereon, these steps are performed in the reverse order.

By the structure described, a removable rim, carrying a fully inflated tire can be placed in a few seconds upon a wheel having a fixed rim, and without the use of special tools, such as are used in a shop.

I claim:

1. A rim for pneumatic tires, comprising a transversely split channeled ring adapted to receive the tire, in combination with means for spreading said ring against the compressive action of said tire, to permit it to slip over the wheel, said means being also adapted when released to permit said rim to contract and firmly grip said wheel under said compressive action of said tire, substantially as described.

2. The combination of an inflated tire and a rim on which said tire is mounted, said rim being cut transversely and provided with projecting portions, whereby said rim may be expanded, against the pressure of the tire, so that it may be slipped over a vehicle wheel, substantially as described.

3. The combination of an inflated tire and a rim on which said tire is mounted, said rim being cut transversely and provided with means whereby, by the application of pressure, said rim may be expanded against the pressure of said tire, and also provided with a closure fitted across the break, substantially as described.

4. The combination of a wheel body, a removable rim carrying a fully inflated tire, said rim being cut transversely and having a plate over the break, and also having means whereby said rim may be expanded against the pressure of said tire, and means for clamping the entire structure together, substantially as described.

5. The combination of a wheel body provided with a felly, and a fixed rim having an abutment, with a removable rim carrying an inflated tire, said removable rim having normally an inside diameter equal to the outside diameter of said fixed rim, and said removable rim being cut transversely and having a plate fitted across the break, and also having means whereby said removable rim may be expanded against the pressure of the tire, so that it may be readily slipped over the fixed rim, and means for securing the entire structure together, substantially as described.

In testimony whereof, I affix my signature, in presence of two witnesses.

ANDRÉ JULES MICHELIN.

Witnesses:
R. H. BRANDON,
HANSON C. COXE.